UNITED STATES PATENT OFFICE.

PHILIPP OTT AND THILO KROEBER, OF ELBERFELD, GERMANY, ASSIGNORS TO THE FARBENFABRIKEN OF ELBERFELD COMPANY, OF NEW YORK, N. Y.

BLUE AZIN DYE.

SPECIFICATION forming part of Letters Patent No. 602,544, dated April 19, 1898.

Application filed September 14, 1897. Serial No. 651,583. (Specimens.) Patented in Germany May 21, 1893, No. 79,189; in France June 8, 1893, No. 230,692; in England June 16, 1893, No. 11,892; in Italy December 31, 1893, XXVIII, 35,092, and LXVIII, 498, and in Austria-Hungary June 18, 1894, No. 63,659 and No. 95,281.

*To all whom it may concern:*

Be it known that we, PHILIPP OTT and THILO KROEBER, chemists, doctors of philosophy, subjects of the German Emperor, residing at Elberfeld, Germany, (assignors to the FARBENFABRIKEN OF ELBERFELD COMPANY, of New York,) have invented certain new and useful Improvements in the Manufacture of Azin Dye, (for which the Farbenfabriken, vormals Fr. Bayer & Co., of Elberfeld, Germany, has already obtained Letters Patent in Germany, No. 79,189, dated May 21, 1893; in England, No. 11,892, dated June 16, 1893; in Austria-Hungary, No. 63,659 and No. 95,281, dated June 18, 1894; in France, No. 230,692, dated June 8, 1893, and in Italy, Reg. Gen., Vol. XXVIII, No. 35,092, Reg. Att., Vol. LXVIII, No. 498, dated December 31, 1893;) and we do hereby declare the following to be an exact and clear description of our invention.

Our invention relates to the production of new azin dyestuffs by condensing the 8 sulfoacids of symmetrically-disubstituted 1.3 naphthylenediamins having the general formula

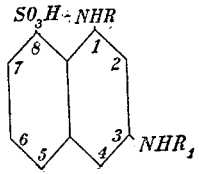

(in which formula R and $R_1$ represent either the same or different aromatic radicals, such as phenyl, tolyl, or the like) with disubstituted amidoazosulfo-acids of the following formula:

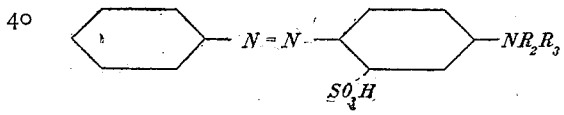

($R_2$ and $R_3$ representing in this formula either the same or different fatty radicals, such as methyl, ethyl, or the like.)

In order to carry out the new process profitably, one and a half molecular proportions of an alkaline salt of one of the above-defined amidoazosulfo-acids are gently heated together with one molecular proportion of one of the hereinbefore-mentioned disubstituted naphthylenediaminsulfo-acids in the presence of a suitable solvent or diluent. The dyestuffs thus obtained are the alkaline salts of acids having most probably the following general formula:

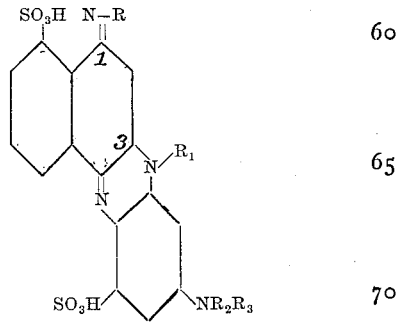

(in which formula R, $R_1$, $R_2$, and $R_3$ represent the radicals hereinbefore defined.) When dry and pulverized, they are dark powders, which dissolve in water with comparative ease, yielding blue solutions, and are soluble in concentrated sulfuric acid with a green color. They dye unmordanted wool in acid-baths blue even shades of a great brilliancy, which withstand the action of acids and alkalies and are also pretty fast against the action of light.

In carrying out our new process practically we can proceed as follows: 23.5 kilos, by weight, of diphenyl, 1.3 naphthylenediamin, 8 sulfo-acid, and 29.5 kilos, by weight, of the sodium salt (or the correspondent quantity of another alkaline salt) of dimethyl-amidoazobenzene sulfo-acid having the formula:

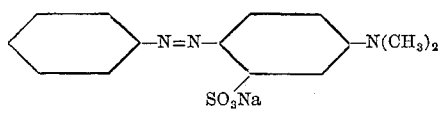

are mixed with 300 kilos, by weight, of amyl alcohol. After heating the resulting mixture for about ten hours at from 100° to 130° centigrade the most part of the dyestuff produced during the reaction has separated in the shape of dark glittering crystals, which are filtered off from the liquid without previous cooling. The new coloring-matter thus obtained is the sodium salt of the acid, which most probably has the following formula:

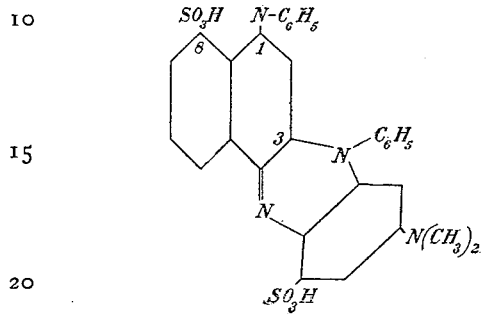

When dried and pulverized, the dyestuff represents a dark powder which dissolves in water with a blue color. In ammonia-liquor (twenty per cent.) it dissolves rather easily with a blue color. By concentrated sulfuric acid it is dissolved with a green color, which turns into violet on the addition of a small quantity of ice, while a dark-blue flaky precipitate is separated if a larger quantity of ice is added to the sulfuric-acid solution. The new dyestuff is insoluble in a ten-per-cent. solution of sodium carbonate and in strong soda-lye. If diluted hydrochloric or sulfuric acid is added to its watery solution, a precipitate of little crystals is separated, which exhibits a splendid luster.

The new coloring-matter dyes unmordanted wool in acid-baths bright blue even shades, which withstand the action of acids and alkalies and are also pretty fast against the action of light.

Having now described our invention and in what manner the same is to be performed, what we claim as new, and desire to secure by Letters Patent, is—

1. Process for producing new azin dyestuffs by condensing sulfo-acids of symmetrically-disubstituted 1.3 naphthylenediamins having the sulfo group in position 8 and having the general formula

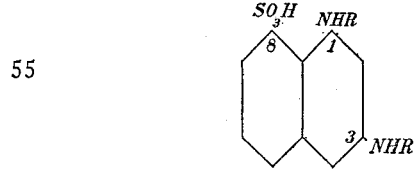

in which formula R and $R_1$ represent aromatic radicals such as phenyl, tolyl, with disubstituted amidoazo-benzene sulfo-acids of the following formula

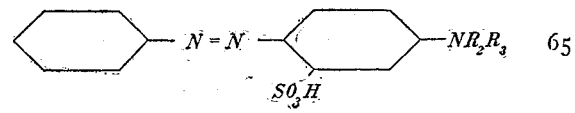

in which formula $R_2$ and $R_3$ represent fatty radicals, such as methyl, ethyl, substantially as described.

2. Process for producing a new azin dyestuff by heating in the presence of a suitable diluent, which may also act as a solvent, one molecular proportion of diphenyl 1.3 naphthylenediamin 8 sulfo-acid, having the formula:

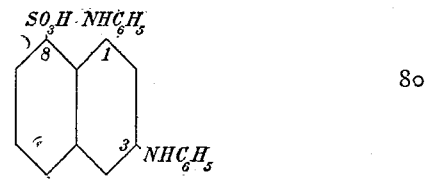

with one and a half molecular proportion of an alkaline salt of dimethyl-amidoazo-benzene sulfo-acid having the formula

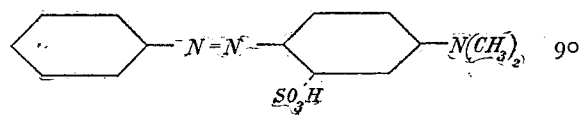

substantially as described.

3. As a new article of manufacture the new azin dyestuffs, obtainable from 8 sulfo-acids of symmetrically - disubstituted 1.3 naphthylenediamins having the sulfo group in position 8 and disubstituted amidoazo-benzene sulfo-acids, being alkaline salts of the acids of the general formula

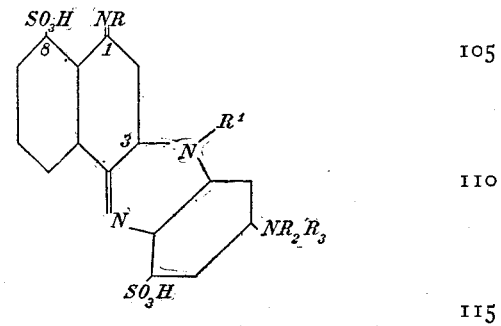

in which formula R and $R_1$ represent aromatic radicals, and $R_2$ and $R_3$ fatty radicals, representing when dry and pulverized dark powders, dissolving in water yielding blue solutions, soluble in concentrated sulfuric acid with a green color, dyeing unmordanted wool in acid - baths bright and even blue shades which are fast to acids and alkalies and also pretty fast against the action of light, substantially as described.

4. As a new article of manufacture the specific azin dyestuff obtainable from diphenyl 1.3 naphthylenediamin 8 sulfo-acid and dimethyl-amidoazo-benzene sulfo-acid, being an alkaline salt of the acid of the formula

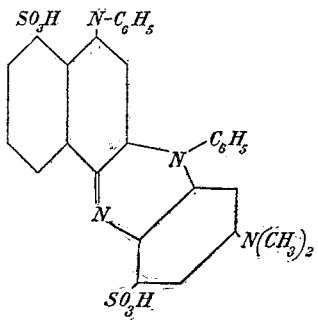

representing when dry and pulverized a dark powder soluble in water with a blue color dissolving in concentrated sulfuric acid with a green color which turns into violet on the addition of a small quantity of ice, while a dark-blue flaky precipitate is separated on adding a larger quantity of ice, insoluble in a ten-per-cent. solution of sodium carbonate and in strong soda-lye, dyeing wool in acid-baths bright blue even shades which are fast to acids and alkalies and also pretty fast against the action of light, substantially as described.

In testimony whereof we have signed our names in the presence of two subscribing witnesses.

PHILIPP. OTT.
THILO KROEBER.

Witnesses:
R. E. JAHN,
OTTO KÖNIG.